United States Patent
Malausa

(10) Patent No.: US 8,033,193 B2
(45) Date of Patent: Oct. 11, 2011

(54) DEVICE FOR INTERRUPTING SELECTIVELY A ROTARY TRANSLATIONAL MOVEMENT

(75) Inventor: Andrea Malausa, Ponte di Piave (IT)

(73) Assignee: Nice SpA, Oderzo (IT)

(*) Notice: Subject to any disclaimer, the term of this patent is extended or adjusted under 35 U.S.C. 154(b) by 1259 days.

(21) Appl. No.: 11/700,221

(22) Filed: Jan. 30, 2007

(65) Prior Publication Data

US 2007/0147972 A1 Jun. 28, 2007

Related U.S. Application Data

(63) Continuation of application No. PCT/EP2005/053607, filed on Jul. 25, 2005.

(30) Foreign Application Priority Data

Aug. 4, 2004 (IT) .............................. TV20040036 U

(51) Int. Cl.
*F16H 25/20* (2006.01)
(52) U.S. Cl. ...................... 74/89.37; 74/89.23; 192/141
(58) Field of Classification Search ................ 74/89.23, 74/89.37; 192/141, 143
See application file for complete search history.

(56) References Cited

U.S. PATENT DOCUMENTS

| 3,277,737 | A | | 10/1966 | Goodman |
| 3,718,215 | A | | 2/1973 | Mimeur |
| 4,482,211 | A | * | 11/1984 | Fisher ........................... 359/877 |
| 5,027,671 | A | | 7/1991 | Erikson et al. |
| 5,450,988 | A | | 9/1995 | Jerdee |
| 6,789,909 | B2 | * | 9/2004 | Sakamoto et al. ............ 359/871 |
| 2002/0046817 | A1 | | 4/2002 | Last |

FOREIGN PATENT DOCUMENTS

| FR | 2730022 | 8/1996 |
| GB | 779420 | 7/1957 |
| JP | 4-78359 | 3/1992 |
| JP | 11-270645 | 10/1999 |

OTHER PUBLICATIONS

International Search Report and the Written Opinion of the International Searching Authority mailed Oct. 26, 2005.

* cited by examiner

*Primary Examiner* — William C Joyce
(74) *Attorney, Agent, or Firm* — Katten Muchin Rosenman LLP

(57) ABSTRACT

A device for interrupting selectively a rotary translational movement, includes a threaded elongated element and an element having a female thread mating with the tread of the elongated element, one of said elements performing a translatory movements as far as at least a position defined by an end-of-travel stop as a result of engagement with the other element, and said translating element being able to undergo momentary deformation upon reaching said at least one end-of-travel position with the effect of being disengaged from the other element.

11 Claims, 6 Drawing Sheets

DEVICE FOR INTERRUPTING SELECTIVELY A ROTARY TRANSLATIONAL MOVEMENT

CROSS REFERENCE TO RELATED APPLICATION

This application is a continuation of International Application Number PCT/EP2005/053607 filed Jul. 25, 2005, now International Publication WO 2006/013172, and claims priority from Italian Patent Application Number TV2004 U 000036 filed Aug. 4, 2004, the contents of which are herein incorporated by reference.

BACKGROUND OF THE INVENTION

1. Field of the Invention

The present invention relates to a device for interrupting selectively a rotary translational movement, which is in particular used in a device for limiting the number of rotations of a mechanical shaft in an actuating system for roller blinds.

2. Description of the Related Art

In many applications a device is required for interrupting a rotary translational movement in a selective manner, i.e. controlled and/or influenced by particular boundary conditions. Although complex systems for achieving this object are known (for example using electronic control), it is extremely convenient to have the possibility of a simple and reliable solution. In the following description reference is made to an exemplar case—a device for limiting the number of rotations of a mechanical shaft—while not wishing in any way to limit the scope of the invention.

In an actuating system for roller blinds a mechanical shaft forms the main actuating member and it is required to control the rotational movement thereof. In particular, a very frequent method of control is based on the number of revolutions which the shaft performs in both directions. In said actuating systems the roller blind (curtain, shutter, etc.) is wound up on and unwound from a roller integral with the shaft such that control of the number of rotations may be converted into control of the end-of-travel position of the roller blind.

The closest state of the art for this application may be regarded as being the device 1 described in U.S. Pat. No. 3,718,215, now lapsed, from which cross-sectional figures are shown in FIG. 1 and FIG. 2. A splined shaft 10, which is integral with the mechanical shaft 55 to be controlled (shown in schematic form) and actuated by a motor 20, engages with two gear wheels 12 in turn each engaged by means of a female thread on a threaded spindle 14 on which they are able to move longitudinally in both directions following their own rotation—see FIG. 1. Depending on the direction of rotation of the splined shaft 10 (and therefore the controlled shaft) one of the two gear wheels 12 reaches and pushes a control element 16 which operates an electric switch 18 (microswitch), varying the opening/closing condition thereof—cf. the upper switch in FIG. 2. The change of state of the switch 18 is detected by the device 1 and the motor 20 is stopped. The other gear wheel 12 instead moves in the opposite direction, if necessary reaching the end of the threaded spindle 14. Clearly in the device 1 there are two sets of elements for being able to control the two directions of rotation of the mechanical shaft 55. Springs 22 push the gear wheels 12 towards the thread of the threaded spindle 14, allowing them to engage again when the latter reverses its direction of rotation. This occurs both when said wheels 12 are in contact with and push the control element 16 and when they are at the opposite end of the spindle 14 and are unscrewed therefrom—cf. FIG. 2. It should be noted that both the gear wheels 12 and the spindles 14 are made of metal. Moreover, it is clear that the gear wheels 12, the threaded spindle 14 and the springs 22 form a device for interrupting selectively a rotary translational movement, precisely that of the wheels 12 on the threaded spindle 14.

The two threaded spindles 14, respectively, extend longitudinally in the form of two rods 70a, 70b, at the end of which a gear wheel 72a, 72b coaxial therewith is present. The wheels 72a, 72b are engaged respectively with two endless screws 74a, 74b. Following installation of the motor it is envisaged adjusting the opening and closing end-of-travel positions. By means of the action of the motor, the roller blind is positioned in the desired opening position and, by means of a suitable implement, such as for example a screw driver, and assuming that the upper spindle 14 is used for adjusting the opening end-of-travel position, the endless screw 74a is turned until, by means of rotation of the rod 70a and therefore the upper spindle 14, the upper gear wheel 12 trips the upper switch 18, which causes stoppage of the motor 20. The subsequent displacement of the roller blind into the closing position and the consequent definition of the position in which the lower gear wheel 12 trips the lower switch 18, using the same method described above for the opening position, causes movement of the upper gear wheel 12 away from the upper switch 18 into a position determined by actuation of the closing end-of-travel stop. This latter position may vary depending on the type of shutter or curtain on which the motor has been mounted and depending on the requirements of the individual user. Upon subsequent opening of the roller blind, the motor will run until one of the wheels 12 actuates one of the switches 18. Therefore the rest (or non-operative) position of the upper and lower wheels 12 may be situated anywhere along the spindle 14 and may be different depending on the adjustments made. Once adjustment has been completed, the screws 74a,b keep the spindles 14 fixed.

The device 1 may be improved, so as to comprise a smaller number of parts, resulting in advantages in terms of weight, lesser complexity and lower cost.

SUMMARY OF THE INVENTION

The object of the present invention is to improve the state of the art. This object is achieved with use of a device for interrupting selectively a rotary translational movement in accordance with the following claims.

BRIEF DESCRIPTION OF THE DRAWINGS

The advantages and characteristic features of the present invention will emerge more clearly from the following description of an embodiment, to be regarded solely by way of an example and as being in no way limiting. The description refers to the accompanying drawing in which.

DETAILED DESCRIPTION OF THE INVENTION

Figure 1:
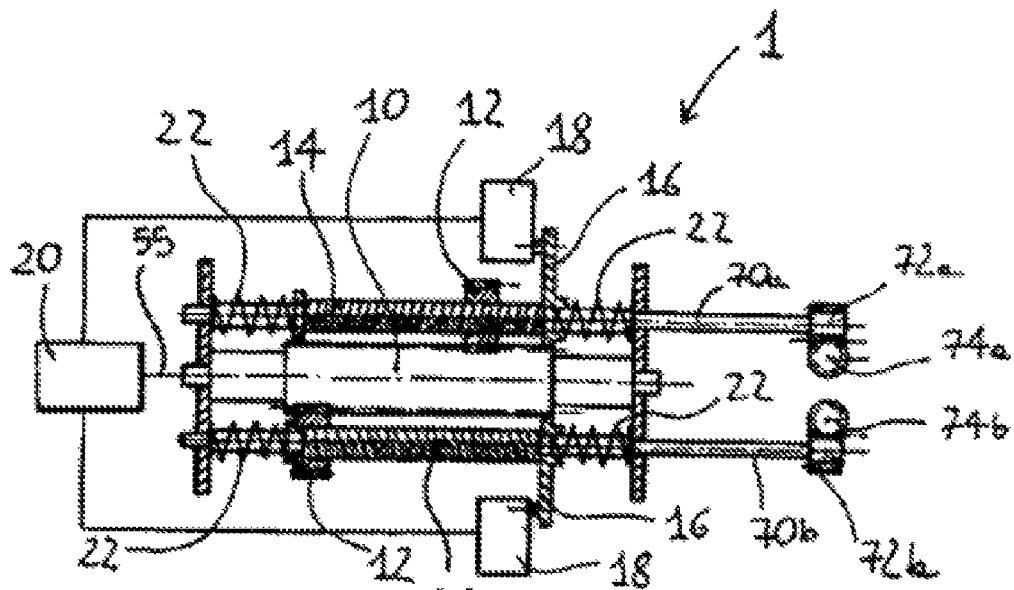
FIG. 1 shows a schematic cross-sectional view of a device according to the state of the art in a first position.
Figure 2:
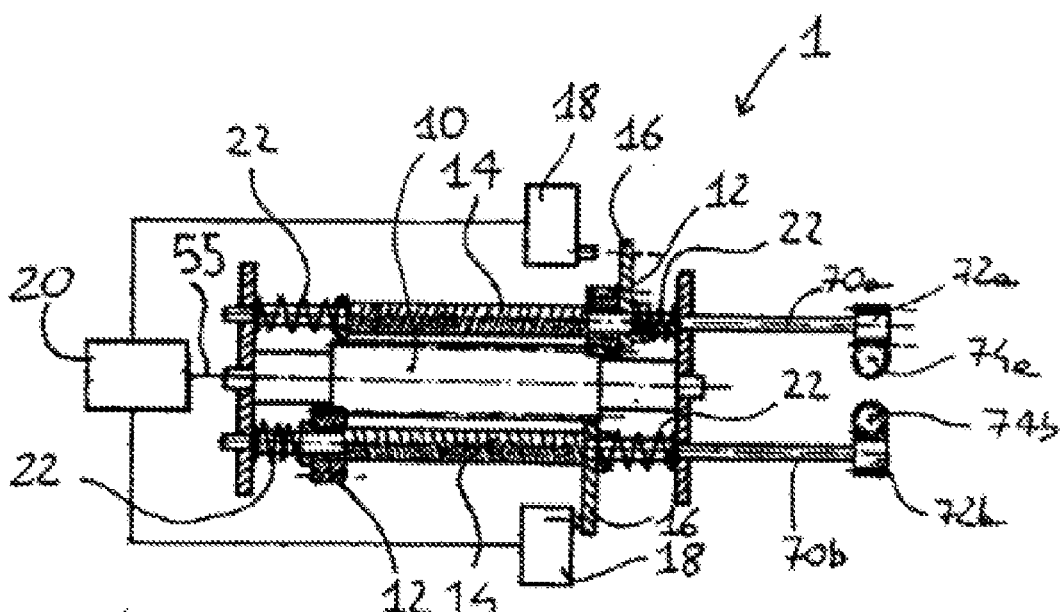
FIG. 2 shows a schematic view of the device according to FIG. 1 in a second position.

The reference number 100 denotes a limiting device which is based on and improves the abovementioned device 1, the numbering of which is maintained with the addition of a suffix "1" for similar elements. The limiting device 100 therefore comprises a splined shaft 110, integral with the shaft 155 to be controlled (shown schematically) and actuated by a motor 120. Said shaft 110 engages with two gear wheels 112 each of which is in turn engaged by means of a female thread on a threaded spindle 114, said shaft 110 being supported by two support flanges 150. As in the case of the abovementioned patent, said wheels 112 may move axially on said spindle 114 in both directions following rotation thereof—cf. FIGS. 3 and 4—and with the same effect: they may reach and push a control element 116 which operates an electric switch 118 (microswitch), varying the opening/closing condition thereof and therefore stopping the motor 120—cf. The upper switch in FIG. 4—or may move along the threaded spindle 114 in the opposite direction to the switches 118. The two threaded spindles 114—as in the case of the known art—are respectively connected coaxially to two rods 170a, 170b, at the end of which there are gear wheels 172a, 172b, coaxial therewith. The wheels 172a, 172b are engaged respectively with two endless screws 174a, 174b. The adjustment of the end-of-travel stops after installation of the motor 120 (i.e. the initial definition of the position of the wheels 112 on the spindle 114) is performed as already described for the known art. Similarly the screws 174a, b keep the spindles 114 fixed after adjustment.

A characteristic of the limiting device 100—due to the special features of the present invention—is the absence of the springs 22 existing in the known art, resulting in the undoubted saving of material and greater simplicity in terms of production and assembly. In order to prevent the wheels 112 from being forced beyond the thread of the threaded spindles 114, no longer managing to engage therewith so as to move in the opposite direction, they are cut along a radius—see FIG. 5 where the cut has the reference number 113. In the case where they are made of plastic, this is achieved without difficulty. Moreover, the distance between the flanges 150 and the end 115 of the thread on the spindles 114 is kept less than the thickness of the gear wheels 112: in this way said wheels 112 are stopped by the flanges 150 before they are able to disengage definitively from the thread on the spindles 114 and, owing to the cut along their radius, they are deformed and splay slightly, rotating idle (see FIG. 4). With reversal in the direction of the motor 120, the wheel 112 reverses its direction of rotation and, engaging again on the thread of the spindle 114, moves away from the adjacent flange 150. A second characteristic feature of the present invention is to make all the rotating parts preferably from plastic, in particular the gear wheels 122 and the threaded spindles 114. In this way these parts may be made by means of moulding, in an efficient and cost-effective manner (plastic has a lower cost and moulding parts from plastic is a less costly process).

It is therefore obvious that this novel system for interrupting selectively a rotary translational movement—namely by means of deformation of the gear wheels 112—achieves the predefined object and simplifies greatly production of the limiting device.

An alternative solution may be to manufacture the abovementioned components from soft plastic or rubber, such that it is not required to cut them in order to obtain the necessary deformation.

Figure 3:
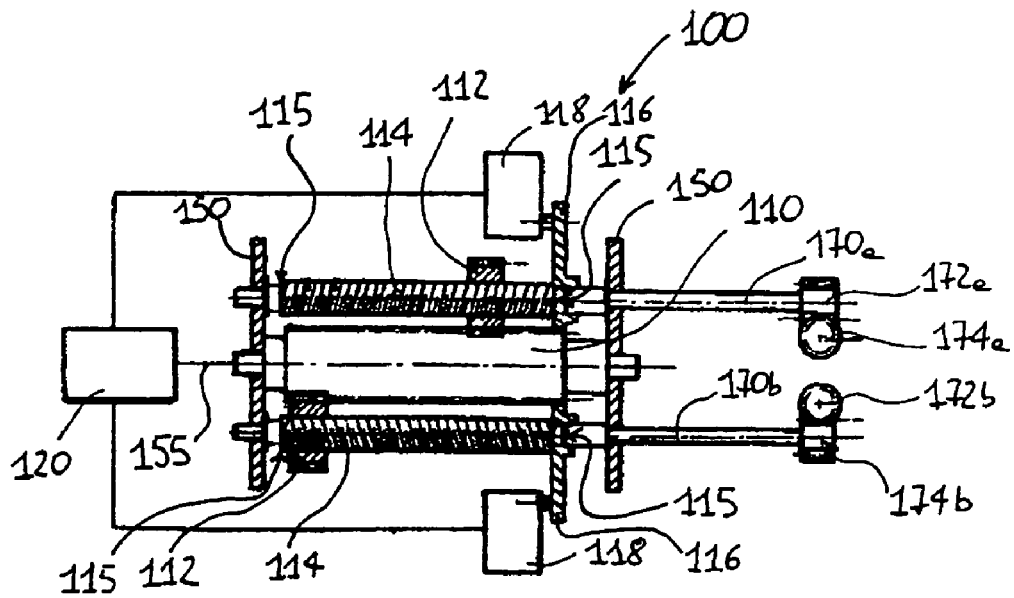
FIG. 3 shows a schematic cross-sectional view of a device which comprises the present invention, in a first position.
Figure 4:
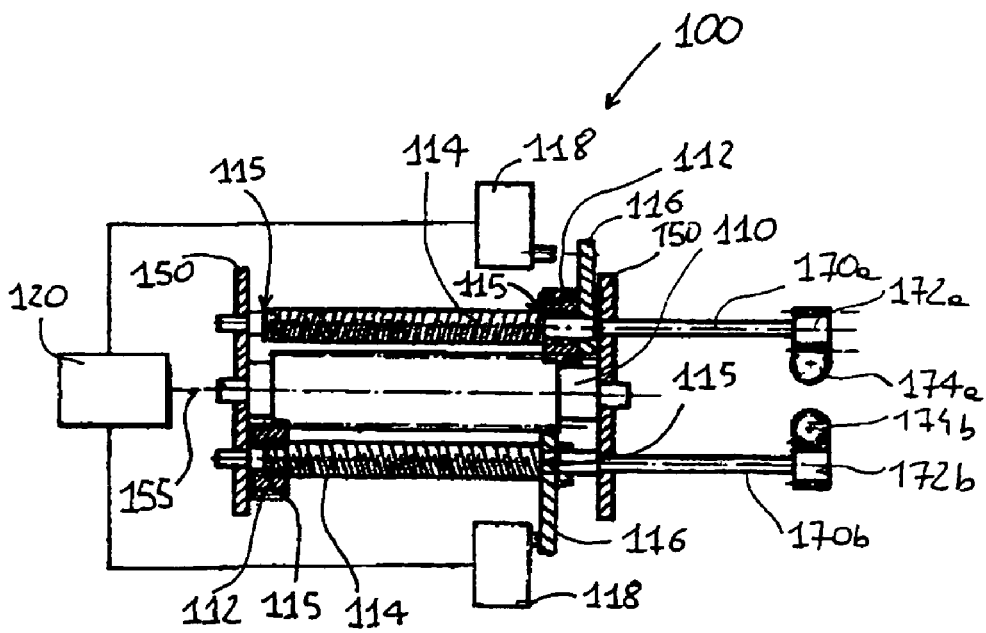
FIG. 4 shows a schematic view of the device according to FIG. 3 in a second position.
Figure 5:
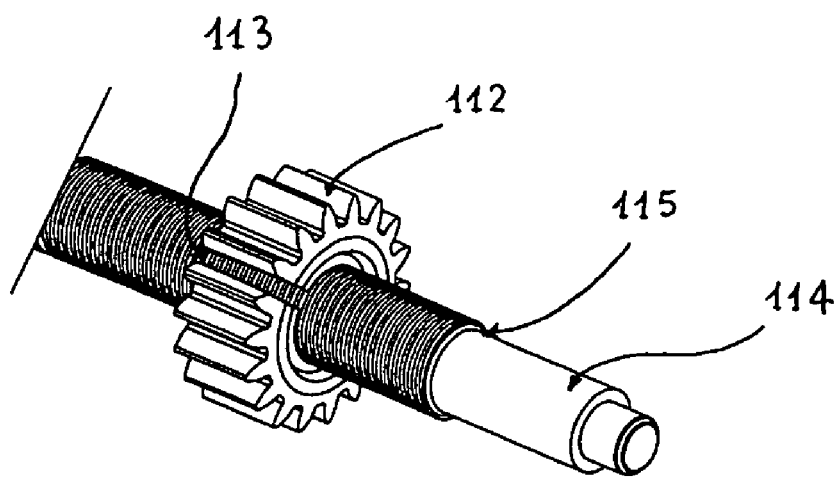
FIG. 5 shows a detail of the device according to the present invention.
Figure 11:
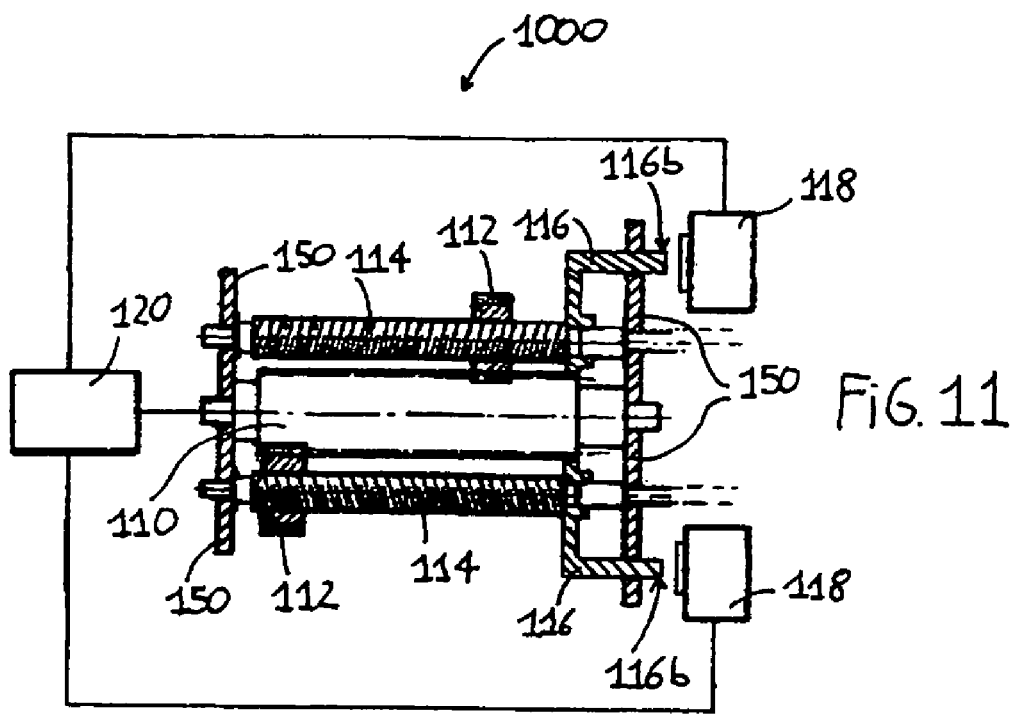
FIG. 11 shows a schematic cross-sectional view of a variant of the device shown in FIG. 3, in a first position.
Figure 12:
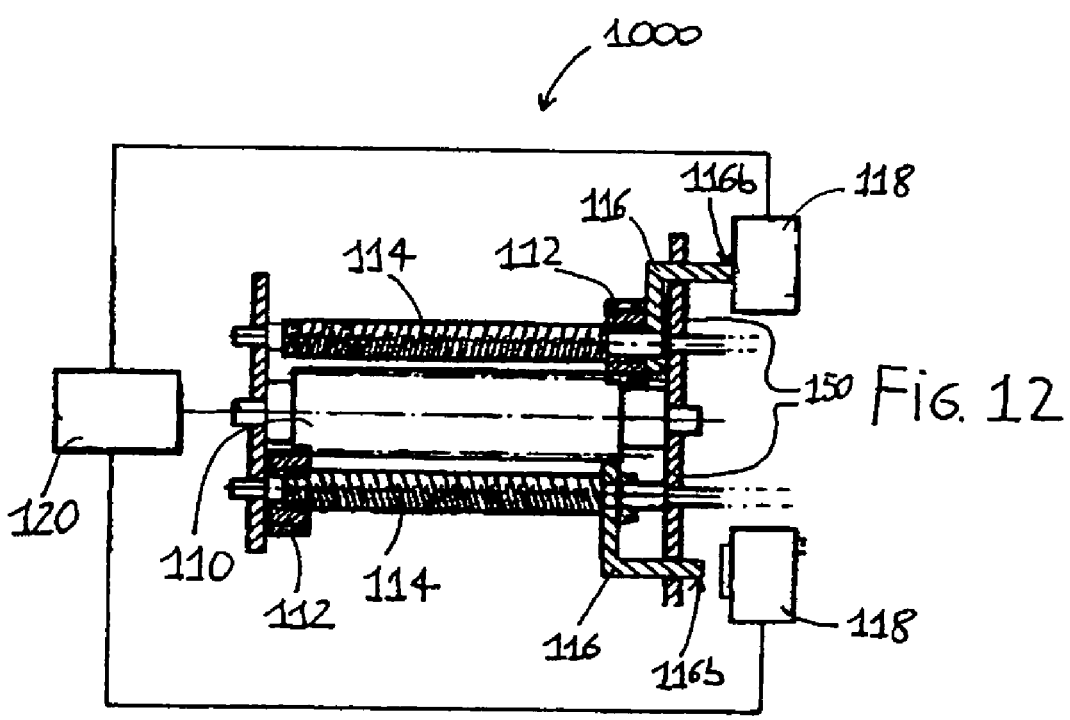
FIG. 12 shows a schematic view of the device shown in FIG. 11, in a second position.

FIGS. 11 and 12 show a variant 1000 of the limiting device 100, in which the same reference numbers used in FIGS. 3 and 4 are maintained for identical parts and the end-of-travel adjustment mechanism (the two rods 170a, 170b, the gear wheels 172a, 172b and the two endless screws 174a, 174b) are not shown. In this case the control elements 116 have an L shape and slide inside an opening of the support flange 150. The electrical switches 118 are arranged outside the flanges 150 and are actuated (see upper switch in FIG. 12) by one end 116b of the elements 116. The rest of the device is functionally identical to the previous device. It should be noted that in this variant it is possible to establish the end-of-travel position of the wheels 112—as an alternative to using the flanges 150 or the screws 174a, b—by making use of the length of the ends 116b and the resistance of the body of the switches 118 to the control elements 116 (and therefore to the wheels 112).

Figure 8:
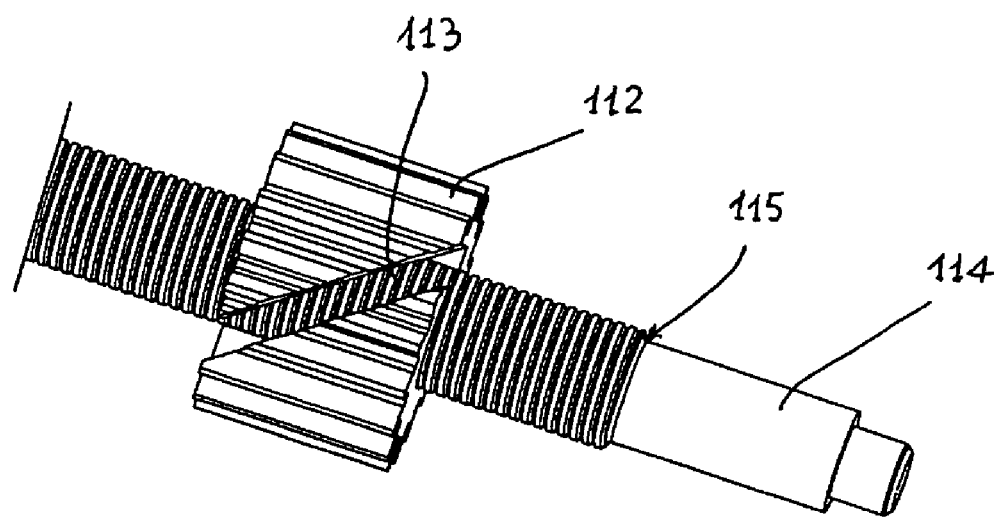
FIG. 8 shows a detail of another variant of the device according to the present invention.
Figure 10:
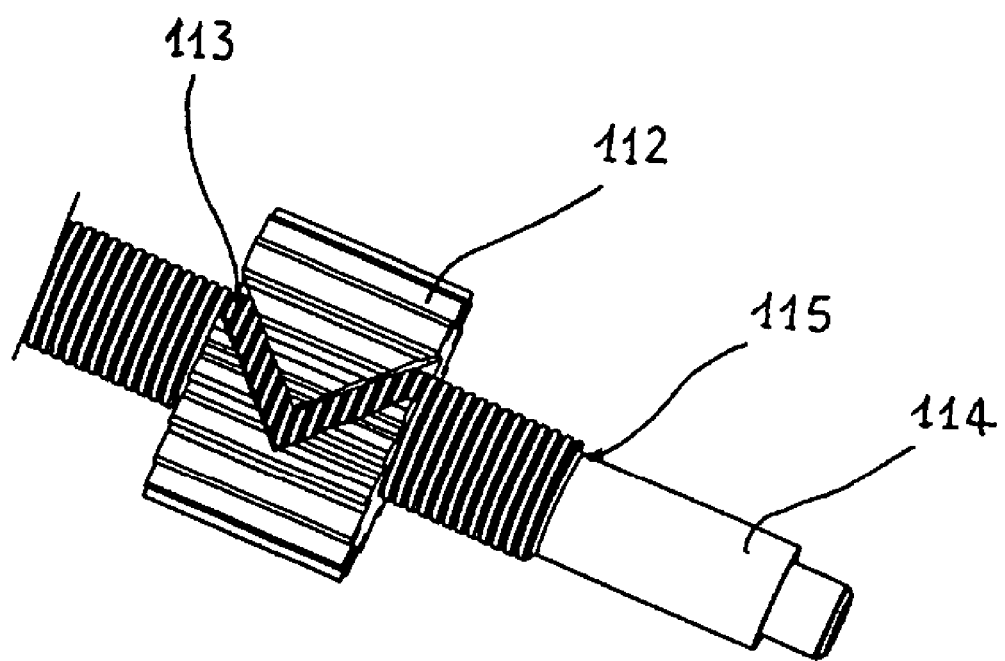
FIG. 10 shows a detail of another variant of the device according to the present invention.

The cut 113 in the gear wheel 112 may be not only linear (see FIG. 5) but also have a different progression, for example a V-shaped progression (see FIG. 10) or transverse progression (see FIG. 8). The configurations of the cut 113 shown in FIGS. 8 and 10 are such that one or more teeth of the wheel 112 need not be eliminated completely, improving the grip of the latter on the splined shaft 110. Grooves with different forms may obviously be envisaged.

Figure 6:
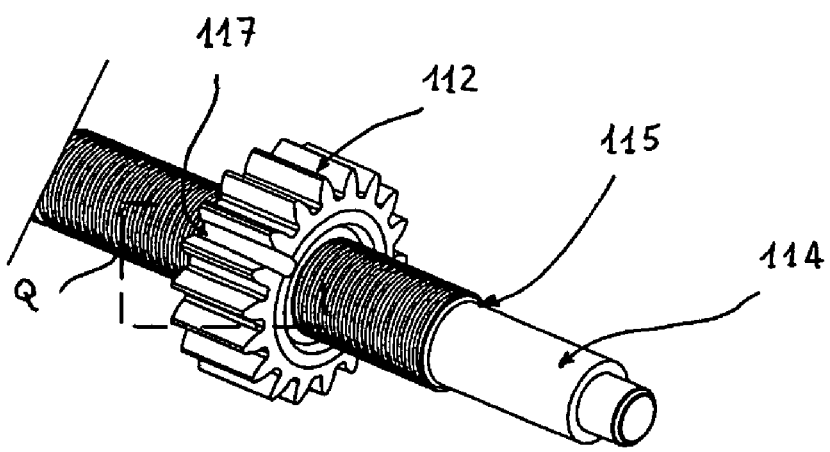
FIG. 6 shows a detail of a variant of the device according to the present invention.
Figure 7:
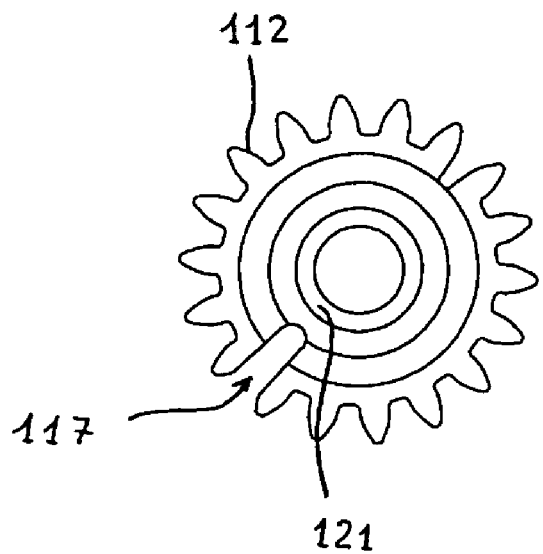
FIG. 7 shows an enlarged view of a detail contained in the inset Q of FIG. 6.

In this case the cut (or groove) interrupts the internal thread of the wheel 122. A variant of the invention is shown in FIGS. 6 and 7. Instead of cutting the wheel 112, it may be sufficient to form a groove 117 therein parallel to the teeth. In this way an annular zone 121 of the wheel 112 remains completely in contact with the thread—favouring an optimum grip—but its thickness is somewhat smaller so that it is able to expand when stressed and cause the wheel 112 to disengage from the thread of the spindle 114.

Figure 9:
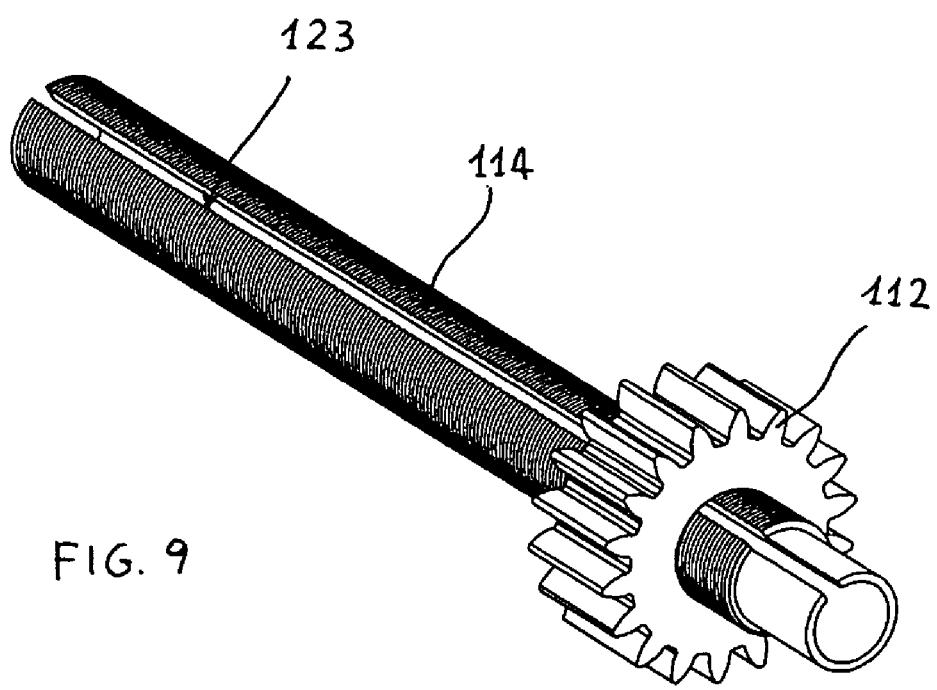
FIG. 9 shows a detail of another variant of the device according to the present invention.

In order to allow the gear wheel 112 to jump on the thread of the spindle 114 into the end-of-travel position, not necessarily is it required to make a cut (or form a groove) in said wheel 112. Another solution is shown in FIG. 9. The threaded spindle 114 is formed hollow and with a longitudinal cut 123 which interrupts its cross-section. When the wheel 112 forces the thread of the spindle 114, the latter gives way, contracting (the cut 123 becomes narrower), and disengages from the wheel 112. It may also be sufficient merely to cut longitudinally on the spindle 114, which is not hollow, along a portion of its thread, a groove which is blind or may extend from one side to the other.

Clearly the number of cuts or grooves may vary depending on the specific cases and consist of more than one. Moreover, it is possible to imagine a device where it is the spindle 114 which performs a rotary translational movement along the thread of a fixed female thread.

The device for interrupting selectively a rotary translational movement according to the present invention may be applied to other mechanisms, for examples devices for detecting obstacles or brakes. The splined shaft 110 may be replaced by a smooth spindle which transmits, via elastic belts, the movement to the wheel 112. Alternatively, the wheel 112 may be smooth instead of having teeth, possibly made of rubber, and in contact with a smooth spindle which causes it to rotate by means of friction. In certain cases it may be convenient to produce these elements using different materials, for example rubber on the outside and an internal thread made of plastic.

It is understood that minor variations with respect to the proposed idea of the present invention are in any case included within the following claims.

The invention claimed is:

1. An actuating system for a roller blind, the actuating system comprising:
    a first shaft; and
    a device for limiting a number of rotations of the first shaft to control a first and a second end-of-travel position of the roller blind, the device comprising
        a second shaft rotating together with the first shaft,
        two elongated elements, each elongated element being substantially parallel to the second shaft, one of the elongated elements having a thread that comprises a different thread direction than a thread of the other elongated element,
        two female-threaded elements, each female-threaded element being mounted respectively on the threads of the respective elongated element, each female-threaded element being engaged with the second shaft and, when rotating with the second shaft, being free to move along the respective thread of one of the elongated element in an opposite direction to the other female-thread element into one of the end-of-travel positions;
    a support for supporting said second shaft and said elongated elements;
    a means for stopping a revolution of said first shaft, the means being provided on said support and actuated by said female-thread elements when they reach one of the end-of-travel position on said elongated elements;
    wherein said female-thread elements or said elongated elements being adapted to undergo momentary deformation upon reaching one of the end-of-travel position with an effect of being disengaged from the thread of the other element;
    wherein said deformation is obtained by means of at least one groove formed in either each of the elongated elements or each of the female-thread elements.

2. The actuating system according to claim 1, wherein said second shaft is splined or smooth.

3. The actuating system according to claim 1, wherein the distance between said support and a respective end of the thread on said elongated elements is less than a thickness of said female-thread elements such that they are locked by the support when they are still engaged with the thread on said elongated elements.

4. The actuating system according to claim 1, wherein a number of revolutions of the roller-blind actuating shaft is limited.

5. The actuating system according to claim 1, wherein said at least one groove interrupts the thread of the corresponding element.

6. The actuating system according to claim 5, wherein said at least one groove has a V-shaped or U-shaped progression.

7. The actuating system according to claim 1, wherein said elongated elements are made of a plastic material or a elastic material.

8. The actuating system according to claim 1, wherein at least one the elongated element is hollow.

9. The actuating system according to claim 1, wherein a longitudinal groove is formed on one of the elongated element and interrupts a cross-section the respective elongated element.

10. The actuating system according to claim 1, wherein at least one of the female thread elements is a toothed wheel or a smooth wheel.

11. An actuating system for a roller blind, the actuating system comprising:
    a first shaft and
    a device for limiting a number of rotations of the first shaft to control an end-of-travel position of a roller blind, the device comprising
        a second shaft adapted to rotating together with said first shaft;
        two elongated elements parallel with said second shaft and each having a thread comprising a thread direction along part of a length of each elongated element;
        two female-threaded elements respectively mounted on the thread of each of said elongated elements, each female-threaded element being engaged with said second shaft and being free to move along the respective thread of one of the elongated element in an opposite direction to the other female-thread element into the end-of-travel position;
    a support for supporting said second shaft and said elongated elements;
    a means for stopping the revolution of said first shaft, the means being provided on said support and actuated by said female-thread elements when the female-thread elements reach the end-of-travel position on said elongated elements;
    wherein said female-thread elements or said elongated elements being adapted to undergo momentary deformation upon reaching the end-of-travel position with an effect of being disengaged from the thread of the other elongated element,
    wherein said deformation is obtained by means of at least one groove formed in at least one of the two elongated elements or female-threaded elements or by means of said elements being made of a plastic material or elastic material.

* * * * *